(12) United States Patent
Park et al.

(10) Patent No.: US 11,480,296 B2
(45) Date of Patent: Oct. 25, 2022

(54) PRESSURE VESSEL WITH BOSS ATTACHED LINER

(71) Applicant: SUNGWOO HITECH Co., LTD., Busan (KR)

(72) Inventors: Byung Hag Park, Busan (KR); Dong Won Choi, Busan (KR)

(73) Assignee: SUNGWOO HITECH CO., LTD., Busan (KR)

( * ) Notice: Subject to any disclaimer, the term of this patent is extended or adjusted under 35 U.S.C. 154(b) by 134 days.

(21) Appl. No.: 17/166,304

(22) Filed: Feb. 3, 2021

(65) Prior Publication Data
US 2022/0214014 A1    Jul. 7, 2022

(30) Foreign Application Priority Data

Jan. 4, 2021 (KR) .......................... 10-2021-0000458

(51) Int. Cl.
*F17C 1/02* (2006.01)

(52) U.S. Cl.
CPC ........ *F17C 1/02* (2013.01); *F17C 2201/0114* (2013.01); *F17C 2203/0604* (2013.01); *F17C 2209/2118* (2013.01); *F17C 2223/0123* (2013.01)

(58) Field of Classification Search
CPC ..................................... F17C 1/08; F17C 1/02
USPC ....................... 220/586, 592, 581, 723; 206/6
See application file for complete search history.

(56) References Cited

U.S. PATENT DOCUMENTS

| 380,139 A | 3/1888 | Scholfield |
| 4,785,956 A * | 11/1988 | Kepler ....................... F17C 1/16 220/62.19 |
| 6,361,055 B1 * | 3/2002 | Grover ....................... F17C 1/06 277/944 |
| 8,733,581 B1 * | 5/2014 | Olson .................... B29D 22/00 220/586 |
| 2014/0312043 A1 * | 10/2014 | Sejima ................ B29C 45/0025 220/586 |
| 2017/0284601 A1 | 10/2017 | Kusaba et al. |
| 2018/0135807 A1 * | 5/2018 | Emori ........................ F17C 1/00 |
| 2018/0238496 A1 | 8/2018 | Otsubo |

FOREIGN PATENT DOCUMENTS

| DE | 102015222391 | 5/2017 | |
| DE | 202018005823 U1 * | 3/2019 | ............... F17C 1/04 |
| EP | 0300931 | 1/1989 | |
| JP | 2002188794 A * | 7/2002 | ............... F17C 1/06 |

(Continued)

*Primary Examiner* — Robert J Hicks
(74) *Attorney, Agent, or Firm* — Lex IP Meister, PLLC

(57) ABSTRACT

A pressure vessel includes a boss tail portion including a boss extension portion having a cylindrical shape and a boss flange portion integrally expanding outward in a radial direction along a circumferential direction above the boss extension portion, a liner portion having a container shape in which an accommodation space is formed to accommodate a fluid therein and a bottom is sealed and coupled, through integral insertion-injection molding, along a top surface of the boss flange portion, and a composite cover portion provided to surround an outer surface of the liner portion and to have a bottom end sealed and coupled while surrounding a bottom surface of the boss flange portion and an outer surface of the boss extension portion.

8 Claims, 3 Drawing Sheets

(56) References Cited

FOREIGN PATENT DOCUMENTS

| JP | 3591034 B2 | * | 11/2004 | ................ F17C 1/00 |
|----|------------|---|---------|----|
| WO | 2010080948 | | 7/2010 | |
| WO | 2017105953 | | 6/2017 | |

* cited by examiner

PRESSURE VESSEL WITH BOSS ATTACHED LINER

CROSS-REFERENCE TO RELATED APPLICATION

This application claims priority to and the benefit of Korean Patent Application No. 10-2021-0000458, filed on Jan. 4, 2021, the disclosure of which is incorporated herein by reference in its entirety.

BACKGROUND

1. Field of the Invention

The present invention relates to a pressure vessel, and more particularly, to a pressure vessel having improved sealing performance.

2. Discussion of Related Art

Generally, gas storage vessels are necessary to store a variety of types of gases such as hydrogen, nitrogen, natural gas, and the like and to discharge stored gases as necessary. Particularly, since gases are in low storage density in a vessel, it is necessary to store gases at high pressure. A pressure vessel utilized in such a high-pressure environment is necessary.

For example, alternative fuel gas vehicles including fuel cell vehicles or compressed natural gas vehicles have storage system structures which vary according to a storage method of fuel gases. Currently, in consideration of a cost, a weight, and simplicity of a storage system, a compressed gas type storage method has been in the spotlight. However, since a gaseous fuel has a low energy storage density, in order to secure more mileage, it is necessary to increase a storage amount or to increase a storage pressure. Particularly, in the case of a vehicle, since there is a limitation in increasing a size of a storage tank due to a limited gas storage system mounting space, it is very significant in a tank technique to safely store gases at a higher pressure.

Also, in the case of a composite tank among fuel gas storage tanks, in order to withstand an internal pressure generated by a compressed gas, a shell is reinforced using fiber-reinforced composites having high specific strength and specific stiffness and a liner configured to maintain gas tightness is inserted therein. Here, forms of fuel gas storage tanks are classified according to materials of liners. A tank in which a metallic liner such as aluminum is inserted is sorted as a type 3, and a tank in which a high-density polymer liner is inserted is sorted as a type 4.

In detail, the type 3 has relatively high stability but has disadvantages such as a high price and low fatigue resistance. On the other hand, in comparison to the type 3, the type 4 has advantages such as a low price and excellent fatigue resistance but has safety problems such as a leakage of hydrogen, decreasing transmission-resistant performance, and the like. Particularly, since a metallic nozzle applied to mount an external valve and a plastic material of a body differ from each other, soundness of air-tightness at a boss extension part is significant.

That is, even when a pressure vessel is manufactured using a plastic liner, it is necessary to use a metallic material or a non-metallic material, which differs from the liner, for a nozzle boss. Accordingly, there is a problem of degradation of adhesion between the metallic or non-metallic nozzle boss and the plastic liner which does not occur when a metallic liner is used.

Here, to redeem the above problems, a plastic clamp is generally used for clamping a plastic liner to a metallic nozzle boss. However, this causes another problem of a difficulty in installing the clamp in the plastic liner.

As another method, a method is used of forming a groove in a nozzle boss and insertion-molding the nozzle boss in the plastic liner. However, it is not easy to implement a perfect adhesion state.

Accordingly, it is urgent to research to prevent abnormal leakage of an internally accommodated fluid by increasing adhesion between a plastic liner and a metallic or nonmetallic nozzle boss.

RELATED ART DOCUMENT

Patent Document

Korean Patent Registration No. 10-1806643

SUMMARY OF THE INVENTION

The present invention is directed to providing a pressure vessel having improved sealing performance.

According to an aspect of the present invention, there is provided a pressure vessel including a boss tail portion including a boss extension portion having a cylindrical shape and a boss flange portion integrally expanding outward in a radial direction along a circumferential direction above the boss extension portion, a liner portion having a container shape in which an accommodation space is formed to accommodate a fluid therein and a bottom is sealed and coupled, through integral insertion-injection molding, along a top surface of the boss flange portion, and a composite cover portion provided to surround an outer surface of the liner portion and to have a bottom end sealed and coupled while surrounding a bottom surface of the boss flange portion and an outer surface of the boss extension portion.

According to another aspect of the present invention, there is provided a pressure vessel including a boss tail portion including a boss extension portion having a cylindrical shape and a boss flange portion integrally extending from a top of the boss extension portion radially outward along a circumferential direction and including a protruding edge portion having a top surface from which a recessed groove is recessed downward and extending and protruding upward while surrounding a periphery of the recessed groove and a filling-communication hole formed to pass through the protruding edge portion and having an outer end communicating with an exterior of the protruding edge portion and an inner end communicating with an inner wall of the recessed groove, and a liner portion having a container shape in which an accommodation space is formed to accommodate a fluid therein, a liner extension portion having a bottom extending radially inward along a top surface of the boss flange portion and sealed and coupled through insertion-injection molding while a bottom surface is pressed against the top surface of the boss flange portion is primarily formed, a sealing cover portion further extending from an inner end of the liner extension portion toward an outline of an inner surface corresponding to an outline of an outer surface of the protruding edge portion is secondarily formed, and a liner support portion formed in the filling-communication hole through insertion-injection molding having an outer end integrally connected to an outer part of the sealing cover portion and an inner end integrally connected to an inner part of the sealing cover portion is formed.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, a pressure vessel according to an exemplary embodiment of the present invention will be described in detail with reference to the drawings.

Figure 1:
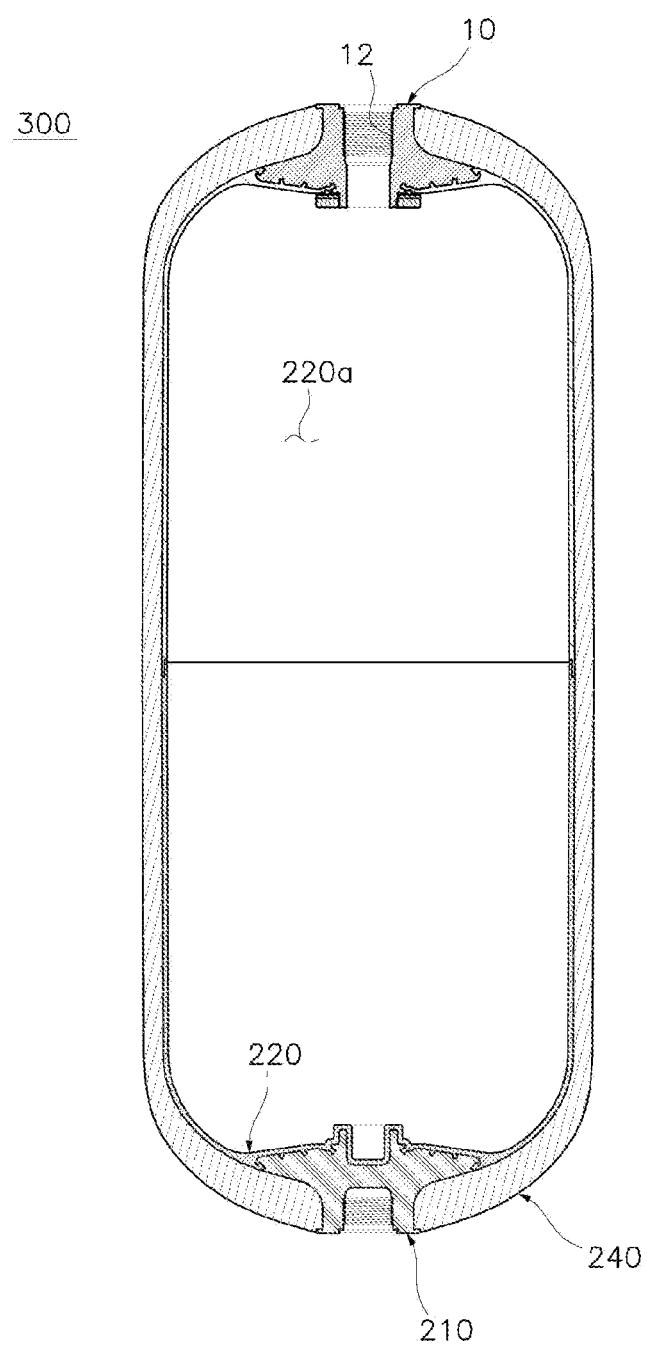
FIG. 1 is a cross-sectional view of a pressure vessel according to one embodiment of the present invention.
Figure 2:
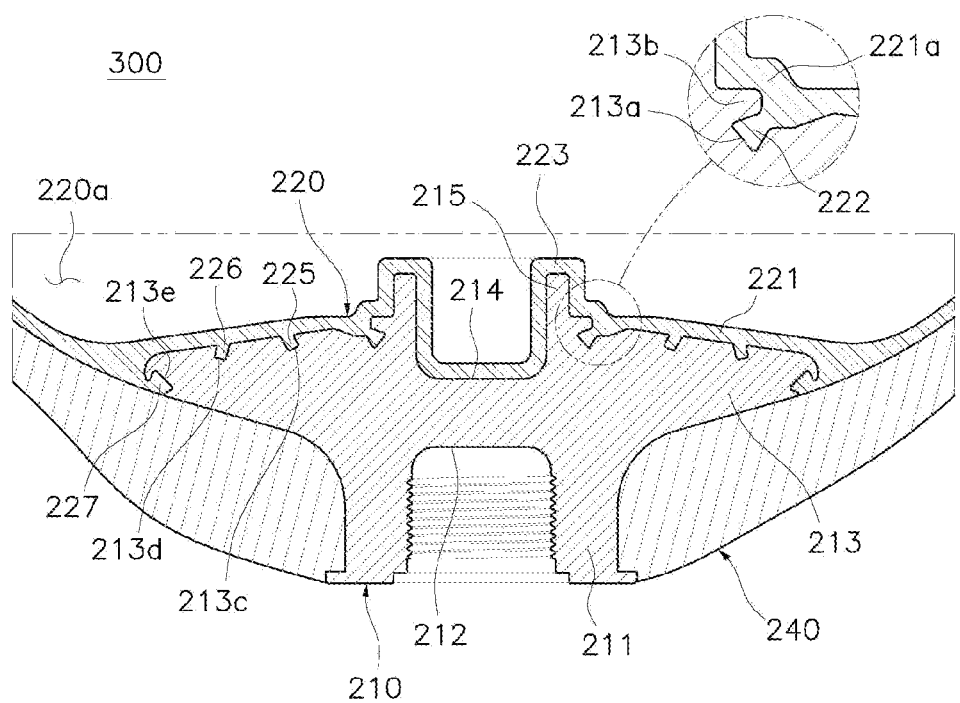
FIG. 2 is a partial cross-sectional view of the pressure vessel according to one embodiment of the present invention.

FIG. 1 is a cross-sectional view of a pressure vessel according to one embodiment of the present invention, and FIG. 2 is a partial cross-sectional view of the pressure vessel according to one embodiment of the present invention.

As shown in FIGS. 1 and 2, a pressure vessel 300 according to one embodiment of the present invention includes a boss tail portion 210, a liner portion 220, and a composite cover portion 240.

Here, the pressure vessel 300 is a vessel used for accommodating a variety of fluids such as oxygen, natural gas, nitrogen, hydrogen, and the like and may be provided to selectively suction and discharge one of the fluids. Here, the fluid may be stored in the pressure vessel 300 at a high pressure of 700 bars.

Meanwhile, the boss tail portion 210 may include a boss extension portion 211 having a cylindrical shape and a boss flange portion 213 integrally expanding outward in a radial direction along a circumferential direction above the boss extension portion 211.

Here, the boss extension portion 211 may have a cylindrical shape in which a lower groove 212 may be formed to be recessed upward from a bottom surface of a central part. Also, the boss extension portion 211 and the boss flange portion 213 are integrally formed and it may be understood that the boss extension portion 211 is formed below the boss tail portion 210 and the boss flange portion 213 is formed above the boss tail portion 210. Here, an outer surface of the boss extension portion 211 may be formed to be rounded and recessed concavely inward in a radial direction along a circumferential direction from a bottom end toward a boundary area with the boss flange portion 213 thereabove.

Also, a bottom surface of the boss flange portion 213 may be formed to have a shape expanding outward in a radial direction along a circumferential direction from a boundary area with the boss extension portion 211 therebelow toward a top end.

Also, a recessed groove 214 may be formed to be recessed downward from a top surface of the boss flange portion 213. Here, the boss flange portion 213 may include a protruding edge portion 215 extending and protruding upward while surrounding a periphery of the recessed groove 214.

Here, the boss tail portion 210 including the boss extension portion 211 and the boss flange portion 213 may be manufactured by processing steel which is metallic, aluminum which is non-metallic, or the like, but a material thereof is not limited thereto.

Meanwhile, the composite cover portion 240 may be configured to surround an outer surface of the liner portion 220 so that a bottom end may be sealed and coupled while surrounding a bottom surface of the boss flange portion 213 and an outer surface of the boss extension portion 211. That is, the composite cover portion 240 may include a bottom pressed against, covering, and surrounding the outer surface of the boss extension portion 211 and the bottom surface of the boss flange portion 213.

Also, in the composite cover portion 240, an inner surface at a center in a vertical direction which extends upward from the bottom pressed against and covering the boss tail portion 210 is provided to surround the liner portion 220. The composite cover portion 240 may be formed by impregnating reinforced fiber such as carbon fiber, glass fiber, synthetic polyamide fiber, and the like into a resin such as an epoxy resin and the like to be wound or laminated, with a preset thickness, outside the boss tail portion 210 and the liner portion 220. Accordingly, the composite cover portion 240 is wound or laminated outside the boss tail portion 210 and the liner portion 220 so that pressure resistance of an accommodation space 220a inside the liner portion 220 may be improved.

Meanwhile, the liner portion 220 may include have a container shape in which the accommodation space 220a is configured to communicate with the recessed groove 214 so as to accommodate a fluid therein while the bottom is sealed and coupled along a bottom surface of the boss flange portion 213 through integral insertion-injection molding. Also, a top of the liner portion 220 may be sealed and coupled, by insertion-injection molding, along a bottom surface of a boss portion 10 in which a through hole 12 is formed at a central part to pass therethrough along a vertical direction to communicate with the accommodation space 220a. Here, the boss portion 10 may include the same material as the boss tail portion 210.

Here, the liner portion 220 may include a synthetic resin material different from that of the boss tail portion 210. Here, the boss tail portion 210 may be inserted between a lower mold (not shown) and an upper mold (not shown), and a separation space (not shown) configured to communicate with the boss tail portion 210 may be formed between the lower mold and the upper mold.

Also, a synthetic resin is injected into the separation space and hardened so that the liner portion 220 may be manufactured through insertion-injection molding. Also, the top and the bottom of the liner portion 220 may be separately manufactured and coupled to each other through laser welding.

Meanwhile, a liner extension portion 221 extending inward in a radial direction along the top surface of the boss flange portion 213 and having a bottom surface pressed against the top surface of the boss flange portion 213 may be formed below the liner portion 220.

Also, a sealing cover portion 223 further extending integrally from an inner end of the liner extension portion 221 to have an outline of an inner surface corresponding to an outline of an outer surface of the protruding edge portion 215 may be secondarily formed below the liner portion 220.

In detail, the sealing cover portion 223 may primarily extend and protrude upward integrally from a radial inner end 221a of the liner extension portion 221 along a circumferential direction while surrounding the outer surface of the protruding edge portion 215.

Also, the sealing cover portion 223 may secondarily be bent and extend inward in a radial direction along a circumferential direction from a top end primarily extending and protruding while surrounding a top surface of the protruding edge portion 215. Subsequently, the sealing cover portion 223 may tertiarily be bent and extend along a circumferential direction from an inner end secondarily bent and extending while surrounding an inner surface of the recessed groove 214. Also, the sealing cover portion 223 may quarternarily be bent and extend from a bottom end tertiarily bent and extending while sealing and covering a bottom surface of the recessed groove 214.

Here, a groove having a bottom surface, which is an area quarternarily bent and extending while corresponding to an outline of an inner circumference of the recessed groove 214, may be formed inward in a radial direction from the tertiarily bent and extending area of the sealing cover portion 223.

Accordingly, the sealing cover portion 223 secondarily extends from the inner end of the liner extension portion 221 primarily extending along the top surface of the boss flange portion 213 toward an outline of an inner surface corresponding to the outer surface of the protruding edge portion 215 surrounding a peripheral part of the recessed groove 214. Accordingly, since the sealing cover portion 223 seals and covers the entire top surface of the boss flange portion 213, detachment between the boss tail portion 210 and the liner portion 220 may be prevented even without an additional sealing device so as to notably improve sealing performance.

Meanwhile, at a top of the boss flange portion 213, a shape-matching and pressing groove 213a surrounding a radial outside of the protruding edge portion 215 and having a cross section with a diameter continuously increasing in a direction radially inward along a circumferential direction may be formed to be recessed.

Here, the shape-matching and pressing groove 213a may be recessed to have a reversed-trapezoidal cross section. Also, the shape-matching and pressing groove 213a may be formed to be tilted downward in an upward direction radially inward. For example, a top surface of the shape-matching and pressing groove 213a may be formed to be horizontal to the bottom surface of the recessed groove 214 and may include an inner surface and a bottom surface thereof which are tilted but is not limited thereto.

In addition, a shape-matching extension portion 222 having a diameter increasing from the inner end 221a of the liner extension portion 221 toward an end to be pressed against and shape-matched with the shape-matching and pressing groove 213a may be formed in the liner portion 220 along a circumferential direction at a part facing the shape-matching and pressing groove 213a.

Also, the shape-matching extension portion 222 may further extend radially inward from the inner end 221a of the liner extension portion 221 and be formed to be tilted downward in an upward direction as the shape-matching extension portion 222 becomes more radially inward. For example, the shape-matching extension portion 222 may be formed to have a top surface and a lower surface which are generally horizontal to each other and to have an inner surface and a bottom surface which are tilted. Also, the shape-matching extension portion 222 may be manufactured through insertion-injection molding to be pressed against and shape-matched with the shape-matching and pressing groove 213a.

Also, a sealing step 213b protruding outward from a top of the shape-matching and pressing groove 213a in a radial direction along a circumferential direction may be formed at the boss flange portion 213. Here, the inner end 221a of the liner extension portion 221 may be pressed against and shape-matched with an outer surface of the sealing step 213b.

Accordingly, the shape-matching extension portion 222 of the liner portion 220 is pressed against and shape-matched with the shape-matching and pressing groove 213a formed to be recessed from the top of the boss flange portion 213 and have a cross section with a reversed-trapezoidal diameter continuously increasing radially inward along a circumferential direction. Simultaneously, the inner end 221a of the liner extension portion 221 is pressed against and shape-matched with the outer surface of the sealing step 213b protruding outward from the top of the shape-matching and pressing groove 213a in a radial direction along a circumferential direction. Accordingly, since a coupling force with the boss tail portion 210 may be firmly maintained even when the liner portion 220 is contracted and relaxed repetitively, sealing performance may be notably improved.

Meanwhile, a first tilted groove 213c recessed to be tilted inward in a radial direction in a downward direction may be formed on the top surface of the boss flange portion 213. Also, a second tilted groove 213d recessed to be tilted outward in a radial direction in a downward direction from a position spaced radially outward apart from the first tilted groove 213c may be formed on the top surface of the boss flange portion 213.

That is, the first tilted groove 213c and the second tilted groove 213d may be recessed from both sides in a radial direction that is a direction which becomes farther away therefrom in a downward direction. Here, a first recession angle between the first tilted groove 213c and the liner extension portion 221 may be set to correspond to a second recession angle between the second tilted groove 213d and the liner extension portion 221. On a case-by-case basis, the first recession angle may be set to be different from the second recession angle.

Also, a first tilted protrusion 225 and a second tilted protrusion 226 which are shaped-matched with and inserted, respectively, into the first tilted groove 213c and the second tilted groove 213d may be formed, through insertion-injection molding, on a bottom surface of the liner extension portion 221 formed below the liner portion 220. Here, the first tilted protrusion 225 and the second tilted protrusion 226 may be integrally formed to extend from the liner extension portion 221.

Here, the first tilted protrusion 225 may extend to be tilted inward in a radial direction from one side of the liner extension portion 221 in a downward direction and be shape-matched with the first tilted groove 213c. Also, the second tilted protrusion 226 may extend to be tilted outward in a radial direction from the liner extension portion 221 at a position spaced radially outward apart from the first tilted protrusion 225 in a downward direction and be shape-matched with the second tilted groove 213d. That is, the first tilted protrusion 225 and the second tilted protrusion 226 may extend to both sides in a radial direction that is a direction which becomes farther away therefrom in a downward direction.

Accordingly, the first tilted groove 213c recessed to be tilted inward in the radial direction in the downward direction and the second tilted groove 213d recessed to be tilted outward in the radial direction in the downward direction while being spaced apart from the first tilted groove 213c are formed on the top surface of the boss flange portion 213. Also, the first tilted protrusion 225 and the second tilted protrusion 226 of the liner extension portion 221 are insertion-injection molded and shape-matched with the first tilted groove 213c and the second tilted groove 213d. Accordingly, occurrence of a vertical gap and deformation between the boss tail portion 210 and the liner portion 220 may be minimized so as to minimize a fluid leakage.

Meanwhile, a peripheral shape-matching groove 213e having a cross section with a diameter continuously increasing in a direction radially inward along a circumferential direction may be formed to be recessed from a radially outer end of the boss flange portion 213. Here, the peripheral shape-matching groove 213e may be formed to be recessed from a bottom surface of the radially outer end of the boss flange portion 213.

Also, a peripheral shape-matching protrusion 227 having a diameter increasing in a direction radially inward along a circumferential direction to be pressed against and shape-matched with the peripheral shape-matching groove 213e may extend and protrude from the top of the liner portion 220 facing the peripheral shape-matching groove 213e.

In detail, the peripheral shape-matching protrusion 227 may primarily extend downward from a radial outside of the liner extension portion 221 to surround the radially outer end of the boss flange portion 213 and secondarily extend to be bent toward the peripheral shape-matching groove 213e. Here, the peripheral shape-matching protrusion 227 may be insertion-injection molded and pressed against and shape-matched with the peripheral shape-matching groove 213e. Here, on a case-by-case basis, the peripheral shape-matching groove 213e may be formed to be recessed from the radially outer end of the boss flange portion 213 so that a diameter of a cross section may continuously increase in an upward direction along a circumferential direction. Also, on a case-by-case basis, the peripheral shape-matching protrusion 227 may extend and protrude from the bottom of the liner portion 220 so that a diameter may increase in an upward direction along a circumferential direction.

Accordingly, the peripheral shape-matching protrusion 227 of the liner portion 220 is insertion-injection molded and shape-matched with the peripheral shape-matching groove 213e recessed from the radially outer end of the boss flange portion 213 while the diameter of the cross section continuously increases toward the radial inside along a circumferential direction. Accordingly, occurrence of a vertical gap and deformation between the boss tail portion 210 and the liner portion 220 may be minimized so as to minimize a fluid leakage.

Also, since the first tilted protrusion 225, the second tilted protrusion 226, and the peripheral shape-matching protrusion 227 of the liner portion 220 firmly fix the boss tail portion 210 in multiple directions, a fixing force may be notably improved.

Figure 3:
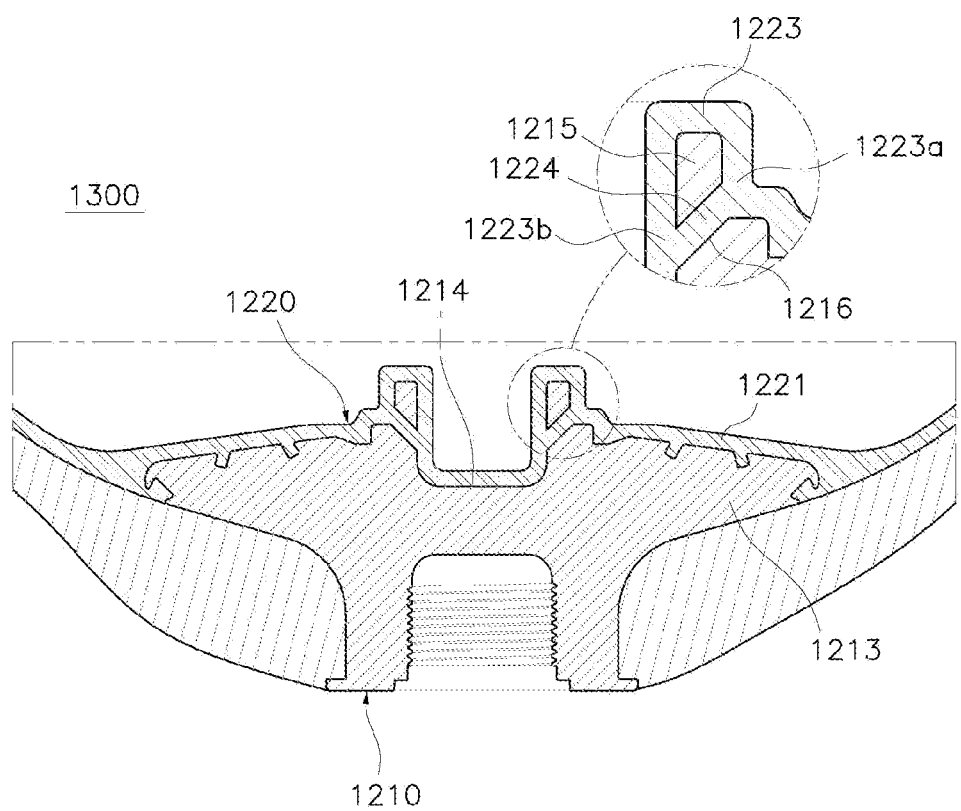
FIG. 3 is a partial cross-sectional view illustrating a modified example of the pressure vessel according to one embodiment of the present invention.

Meanwhile, FIG. 3 is a partial cross-sectional view illustrating a modified example of the pressure vessel according to one embodiment of the present invention. In the modified example, since basic components excluding a filling-communication hole 1216 of a boss tail portion 1210 and a liner support portion 1224 of a liner portion 1220 are equal to those of the above-described one embodiment, a detailed description of the same components will be omitted.

As shown in FIG. 3, a pressure vessel 1300 according to the modified example of one embodiment of the present invention includes the boss tail portion 1210, the liner portion 1220, and a composite cover portion. Here, the boss tail portion 1210 includes a boss extension portion and a boss flange portion 1213 and a detailed description of the same components as those of the above-described one embodiment will be omitted.

In detail, the boss flange portion 1213 may include a recessed groove 1214 formed to be recessed downward from a top surface and a protruding edge portion 1215 extending and protruding upward while surrounding a periphery of the recessed groove 1214.

Also, a liner extension portion 1221 extending inward in a radial direction along the top surface of the boss flange portion 1213 and having a bottom surface pressed against the top surface of the boss flange portion 1213 may be primarily formed below the liner portion 1220.

Also, a sealing cover portion 1223 further extending from an inner end of the liner extension portion 1221 toward an outline of an inner surface corresponding to an outline of an outer surface of the protruding edge portion 1215 may be secondarily formed below the liner portion 1220.

Meanwhile, the filling-communication hole 1216 passing through the protruding edge portion 1215 while an outer end communicates with an exterior of the protruding edge portion 1215 and an inner end communicates with an inner wall of the recessed groove 1214 may be formed to pass through the boss flange portion 1213.

Also, the liner support portion 1224 insertion-injection molded inside the filling-communication hole 1216 may be formed on the liner portion 1220. Here, the liner support portion 1224 may have an outer end integrally connected to an outer portion 1223a of the sealing cover portion 1223 and an inner end integrally connected to an inner portion 1223b of the sealing cover portion 1223.

Here, a plurality of such filling-communication holes 1216 are formed to be spaced at a preset interval apart from each other along a circumferential direction of the boss flange portion 1213. Also, a plurality of such liner support portions 1224 may be formed corresponding to the filling-communication holes 1216 and may be disposed to be spaced at an interval corresponding to the interval between the filling-communication holes 1216 apart from each other.

Meanwhile, the filling-communication hole 1216 having the outer end communicating with the exterior of the protruding edge portion 1215 and the inner end communicating with the inner wall of the recessed groove 1214 may be formed to pass through the protruding edge portion 1215. Also, the liner support portion 1224 of the liner portion 1220 is pressed against and shape-matched with the filling-communication hole 1216 through insertion-injection molding. Accordingly, since occurrence of a vertical gap and deformation between the boss tail portion 1210 and the liner portion 1220 is minimized and a circumferential rotation of the boss tail portion 1210 is blocked, sealing performance may be improved.

According to the embodiment of the present invention, effects are provided as follows.

First, since a sealing cover portion secondarily extends from an inner end of a liner extension portion primarily extending along a top surface of a boss flange portion toward an outline of an inner surface corresponding to an outer surface of a protruding edge portion of the boss flange portion and integrally seals and covers the entire top surface of the boss flange portion, detachment between the boss tail portion and the liner portion may be prevented without an additional sealing device so as to improve sealing performance.

Second, since a liner support portion of a line portion is pressed and shape-matched, through insertion-injection molding, against and with a filling-communication hole having an outer end communicating with an exterior of the protruding edge portion and an inner end communicating with an inner wall surface of a recessed groove, sealing performance may be notably improved by minimizing occurrence of a vertical gap and deformation between the boss tail portion and the liner portion and blocking of the rotation of the boss tail portion.

Third, since a shape-matching extension portion of a liner portion is shape-matched, through insertion-injection molding, with a shape-matching and pressing groove formed above a boss flange portion to be recessed and have a cross section having a diameter continuously increasing in an inverted trapezoidal shape radially inward along a circumferential direction, a coupling force with the boss tail portion is firmly maintained even when the liner portion is contracted and released repetitively so that airtightness may be notably improved.

Fourth, since a first tilted protrusion and a second tilted protrusion of the liner extension portion are shape-matched, through insertion-injection molding, with a first tilted groove recessed from the top surface of the boss flange portion to be tilted radially inward in a downward direction and a second tilted groove recessed to be tilted radially outward, respectively, occurrence of a vertical gap and deformation between the boss tail portion and the liner portion may be minimized so as to minimize a fluid leakage.

Fifth, when an outer shape-matching protrusion of the liner portion is shape-matched, through insertion-injection molding, with an outer shape-matching groove recessed from an outer end of the boss flange portion to have a cross section with a diameter continuously increasing radially inward along a circumferential direction, the first tilted protrusion, the second tilted protrusion, and the outer shape-matching protrusion may firmly fix the boss tail portion in multiple directions so as to notably improve a fixing force.

As described above, the present invention is not limited to the above-described embodiments and may be modified by one of ordinary skill in the art without departing from the scope of the claims of the present invention and such modifications are included within the scope of the present invention.

What is claimed is:

1. A pressure vessel comprising:
   a boss tail portion comprising a boss extension portion having a cylindrical shape and a boss flange portion integrally expanding outward in a radial direction along a circumferential direction above the boss extension portion;
   a liner portion having a container shape in which an accommodation space is formed to accommodate a fluid therein and a bottom is sealed and coupled, through integral insertion-injection molding, along a top surface of the boss flange portion; and
   a composite cover portion provided to surround an outer surface of the liner portion and to have a bottom end sealed and coupled while surrounding a bottom surface of the boss flange portion and an outer surface of the boss extension portion.

2. The pressure vessel of claim 1, wherein the boss flange portion comprises a recessed groove formed to be recessed downward from the top surface and a protruding edge portion extending and protruding upward while surrounding a periphery of the recessed groove,
   wherein a liner extension portion extending radially inward along the top surface of the boss flange portion and having a bottom surface pressed against the top surface of the boss flange portion is primarily formed below the liner portion, and
   wherein a sealing cover portion extending further from an inner end of the liner extension portion toward an outline of an inner surface corresponding to an outline of an outer surface of the protruding edge portion is secondarily formed.

3. The pressure vessel of claim 2, wherein the boss flange portion comprises a filling-communication hole formed to pass through the protruding edge portion and to have an outer end communicating with an exterior of the protruding edge portion and an inner end communicating with an inner wall of the recessed groove, and
   wherein the liner portion comprises a liner support portion formed on the filling-communication hole through insertion-injection molding, the liner support portion having an outer end integrally connected to an outer part of the sealing cover portion and an inner end integrally connected to an inner part of the sealing cover portion.

4. The pressure vessel of claim 2, wherein a shape-matching and pressing groove surrounding a radial outside of the protruding edge portion and having a cross section with a diameter continuously increasing radially inward along a circumferential direction is formed at a top of the boss flange portion, and
   wherein a shape-matching extension portion having a diameter gradually increasing from an inner end of the liner extension portion toward an end to be pressed against and shape-matched with the shape-matching and pressing groove is formed on a part of the liner portion facing the shape-matching and pressing groove along a circumferential direction.

5. The pressure vessel of claim 4, wherein the boss flange portion comprises a sealing step formed to protrude from a top of the shape-matching and pressing groove radially outward along a circumferential direction, and
   wherein the inner end of the liner extension portion is pressed against and shape-matched with an outer surface of the sealing step.

6. The pressure vessel of claim 1, wherein a first tilted groove is formed in the top surface of the boss flange portion to be tilted radially inward in a downward direction and a second tilted groove spaced outward apart from the first tilted groove in a radial direction is formed to be recessed and tilted radially outward in the downward direction, and
   wherein a first tilted protrusion and a second tilted protrusion which are inserted into and shape-matched with the first tilted groove and the second tilted groove, respectively, are formed on a bottom surface of a liner extension portion formed below the liner portion.

7. The pressure vessel of claim 1, wherein a peripheral shape-matching groove having a cross section with a diameter continuously increasing radially inward along a circumferential direction is formed to be recessed from a radially outer end of the boss flange portion, and
   wherein a peripheral shape-matching protrusion having a diameter increasing radially inward along a circumferential direction extends and protrudes from a top of the liner portion facing the peripheral shape-matching groove to be pressed against and shape-matched with the peripheral shape-matching groove.

8. A pressure vessel comprising:

a boss tail portion comprising a boss extension portion having a cylindrical shape and a boss flange portion integrally extending from a top of the boss extension portion radially outward along a circumferential direction and comprising a protruding edge portion having a top surface from which a recessed groove is recessed downward and extending and protruding upward while surrounding a periphery of the recessed groove and a filling-communication hole formed to pass through the protruding edge portion and having an outer end communicating with an exterior of the protruding edge portion and an inner end communicating with an inner wall of the recessed groove; and a liner portion having a container shape in which an accommodation space is formed to accommodate a fluid therein, a liner extension portion having a bottom extending radially inward along a top surface of the boss flange portion and sealed and coupled through insertion-injection molding while a bottom surface is pressed against the top surface of the boss flange portion is primarily formed, a sealing cover portion further extending from an inner end of the liner extension portion toward an outline of an inner surface corresponding to an outline of an outer surface of the protruding edge portion is secondarily formed, and a liner support portion formed in the filling-communication hole through insertion-injection molding having an outer end integrally connected to an outer part of the sealing cover portion and an inner end integrally connected to an inner part of the sealing cover portion is formed.

* * * * *